(12) United States Patent
Lee (10) Patent No.: US 8,937,677 B2
(45) Date of Patent: Jan. 20, 2015

(54) DIGITAL PHOTOGRAPHING APPARATUS, METHOD OF CONTROLLING THE SAME, AND COMPUTER-READABLE MEDIUM

(75) Inventor: Jae-myung Lee, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 411 days.

(21) Appl. No.: 13/005,036

(22) Filed: Jan. 12, 2011

(65) Prior Publication Data

US 2011/0187914 A1 Aug. 4, 2011

(30) Foreign Application Priority Data

Feb. 2, 2010 (KR) .................. 10-2010-0009671

(51) Int. Cl.
*H04N 5/222* (2006.01)
*H04N 5/235* (2006.01)

(52) U.S. Cl.
CPC .................... *H04N 5/222* (2013.01)
USPC .......................... 348/333.1; 348/362

(58) Field of Classification Search
USPC ............ 348/216.1, 221.1, 222.1, 223.1, 273, 348/345, 362, 371
See application file for complete search history.

(56) References Cited

U.S. PATENT DOCUMENTS

| 2007/0182839 | A1* | 8/2007 | Ogino ................ 348/333.01 |
| 2007/0263112 | A1* | 11/2007 | Shinkai ................ 348/333.01 |
| 2009/0027515 | A1* | 1/2009 | Maruyama et al. ........ 348/223.1 |
| 2009/0295945 | A1* | 12/2009 | Watanabe et al. ........ 348/231.99 |

* cited by examiner

*Primary Examiner* — Trung Diep
(74) *Attorney, Agent, or Firm* — Drinker Biddle & Reath LLP (57) ABSTRACT

A digital photographing apparatus and method of applying settings, including acquiring a sample image, determining types of preview image setting values, generating a plurality of preview images having different groups of setting values, and displaying the plurality of preview images. A user may select a preview image to apply the corresponding setting types and values.

36 Claims, 6 Drawing Sheets

DIGITAL PHOTOGRAPHING APPARATUS, METHOD OF CONTROLLING THE SAME, AND COMPUTER-READABLE MEDIUM

CROSS-REFERENCE TO RELATED PATENT APPLICATION

This application claims the benefit of Korean Patent Application No. 10-2010-0009671, filed on Feb. 2, 2010, in the Korean Intellectual Property Office, the entirety of which is incorporated herein by reference.

BACKGROUND

1. Field of the Invention

Embodiments relate to a digital photographing apparatus, a method of controlling the same, and a tangible computer-readable medium having embodied thereon computer instructions for executing the method.

2. Description of the Related Art

Digital photographing apparatus photographs a subject by converting an optical image into an electrical image signal by using an image pickup device. During shooting, various photograph setting values, such as an exposure value, an iris value, a shutter speed, and a white balance value, may be adjusted automatically or according to a user's selection. The user may obtain a preferred image by adapting the photograph setting values to the photographing environment.

SUMMARY

The herein described apparatus and methods provide a user interface whereby a user can easily apply photograph setting values to the apparatus using preview images.

According to an embodiment, there is provided a method of controlling a digital photographing apparatus, the method including acquiring a sample image; determining one or more types of one or more preview image setting values; generating a plurality of preview images, each preview image having a different preview image setting value for at least one of the determined types; and displaying the plurality of preview images.

The method may further include detecting a user input selecting one of the plurality of preview images; and applying to a digital photographing apparatus a setting type and value corresponding to the selected preview image. The types of the preview image setting values may be determined according to a user selection.

The method may also include recognizing a photographing scene, wherein the types of the one or more preview image setting values may be determined according to the recognizing.

The determining of the types of the one or more preview image setting values may include: determining whether there is a user selection designating at least one type of preview image setting value; if there is a user selection, determining the types of the one or more preview image setting values at least in part according to the user selection and, if there is not a user selection, determining the types of the one or more preview image setting values according to the recognizing.

If the photographing scene is recognized as a night scene, the types of the one or more preview image setting values may include at least one of a hand-shake correction degree, a light irradiation degree, a flash emission amount, and a flash emission type. If the photographing scene is recognized as a beach or snow scene, the types of the one or more preview image setting values may include at least one of an exposure degree, a back light correction degree, and a saturation degree. If the photographing scene is recognized as a portrait, the types of the one or more preview image setting values may include at least one of a portrait correction degree, a red-eye correction degree, a brightness value, and a depth value. If the photographing scene is recognized as a landscape, the types of the one or more preview image setting values may include at least one of a saturation degree, a color, and a depth value. If the photographing scene is recognized as a sport scene, the types of the one or more preview image setting values may include at least one of an exposure degree, a shutter back light, a panning setting value, a continuous shooting setting value, and a continuous auto-focusing setting value. And, If the photographing scene is recognized as a back light scene, the types of the one or more preview image setting values include at least one of an exposure degree, a smart range, a high dynamic range, a spot, a center-weighted, and a multi-segmented metering, a flash, and a bracket setting value.

The method may further include: detecting whether there is a user input selecting at least one of the plurality of preview images; and if a user input is detected, applying to a digital photographing apparatus a setting type and value corresponding to the at least one selected preview image.

And, the method may further include: determining a proposed setting value for at least one of the one or more preview image setting types; and providing information about the proposed setting value.

According to another aspect, there is provided a digital photographing apparatus including: a photographing unit configured to acquire a photographic image and a sample image; a photograph setting value type determining unit configured to determine one or more types of one or more preview image setting values; a preview image generating unit configured to generate a plurality of preview images having different setting values for at least one of the one or more preview image setting values; and a display unit configured to display at least a portion of the plurality of preview images.

According to another aspect of the present invention, there is provided a tangible computer-readable storage medium having embodied thereon computer instructions which, when read by a central processing unit (CPU), cause the CPU to perform a method comprising: acquiring a sample image; determining one or more types of one or more preview image setting values; generating a plurality of preview images, each preview image having a different preview image setting value for at least one of the determined types; and displaying the plurality of preview images.

BRIEF DESCRIPTION OF THE DRAWINGS

The above and other features and advantages of the herein disclosed apparatus and methods will become more apparent in view of exemplary embodiments described with reference to the attached drawings in which.

DETAILED DESCRIPTION

The following description and the attached drawings are provided for better understanding of the disclosed exemplary embodiments. Descriptions of techniques or structures related to the described embodiments which would be obvious to one of ordinary skill in the art may be omitted.

The specification and the drawings are provided for the purpose of illustration and not limitation. Accordingly, the scope of the invention is determined by the claims and their equivalents.

Exemplary embodiments will now be described more fully with reference to the accompanying drawings, in which like reference numerals designate like parts.

Figure 1:
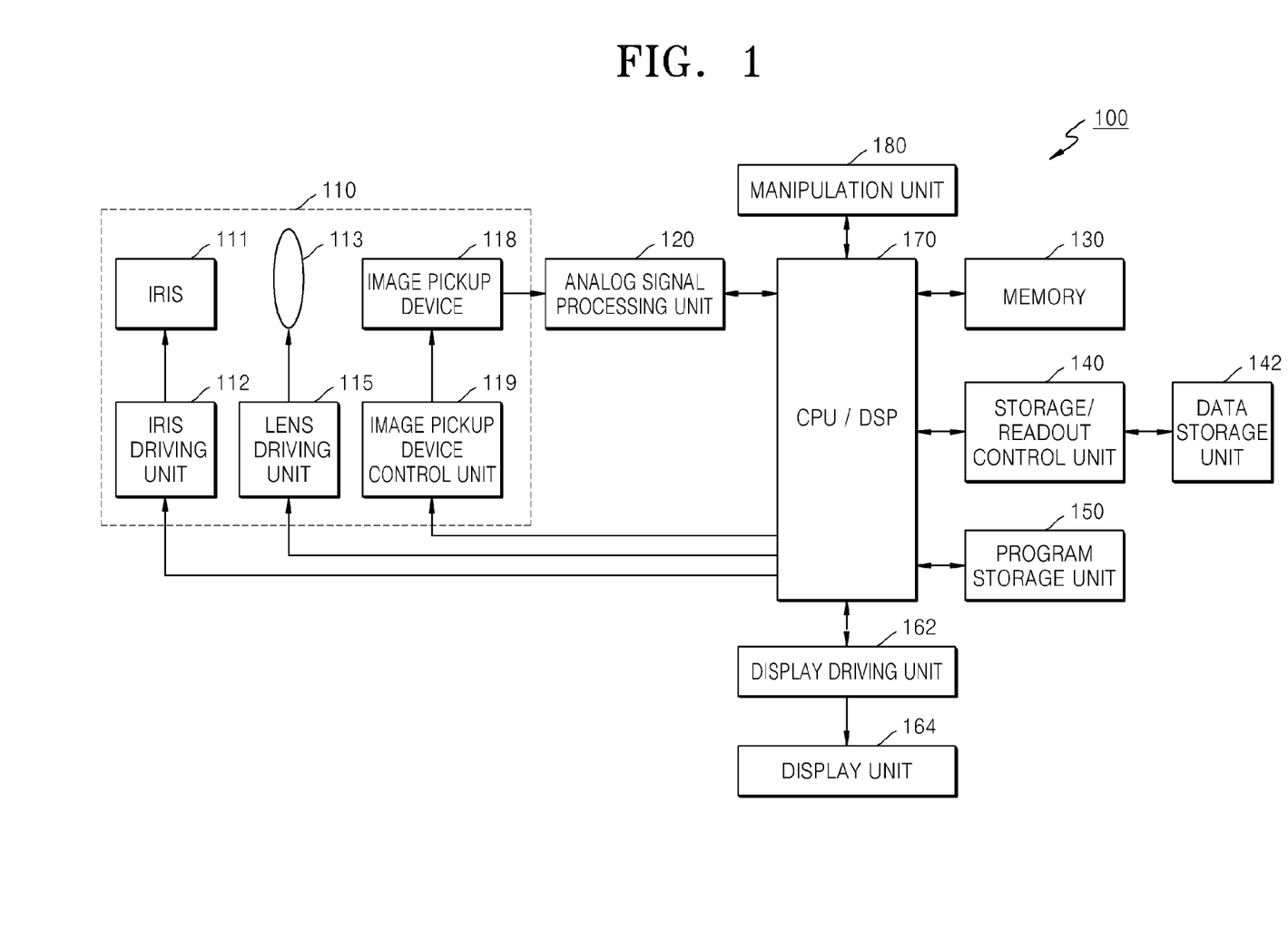
FIG. 1 is a block diagram of a digital photographing apparatus according to an embodiment.

FIG. 1 is a block diagram of an exemplary digital photographing apparatus 100 according to an embodiment. In FIG. 1, a digital photographing apparatus 100 includes a photographing unit 110, an analog signal processing unit 120, a memory 130, a storage/readout control unit 140, a data storage unit 142, a program storage unit 150, a display driving unit 162, a display unit 164, a central processing unit/digital signal processing (CPU/DSP) unit 170, and a manipulation unit 180.

The CPU/DSP unit 170 controls the overall operation of the digital photographing apparatus 100. The CPU/DSP unit 170 respectively provides control signals to an iris driving unit 112, a lens driving unit 115, and an image pickup device control unit 119, to control operations of the iris driving unit 112, the lens driving unit 115, and the image pickup device control unit 119.

The photographing unit 110 generates an electrical image signal from incident light, and includes an iris 111, the iris driving unit 112, a lens unit 113, the lens driving unit 115, an image pickup device 118, and the image pickup device control unit 119.

The iris driving unit 112 adjusts the degree of opening and closing of the iris 111, which adjusts the amount of light incident on the image pickup device 118.

The lens unit 113 may include a plurality of lenses such as a zoom lens and a focus lens. The lens driving unit 115 adjusts the disposition of the lens unit 113 according to a control signal provided by the CPU/DSP unit 170.

An optical signal passing through the iris 111 and the lens unit 113 reaches a light-receiving surface of the image pickup device 118 to form an image of a subject. The image pickup device 118 may be a charge-coupled device (CCD) image sensor or a contact image sensor (CIS) which converts the optical signal into an electrical signal. The image pickup device control unit 119 may adjust the sensitivity of the image pickup device 118. The image pickup device control unit 119 may control the image pickup device 118 according to a control signal that is automatically generated based on a real-time input image signal, or according to a control signal that is manually input by a user's manipulation.

A shutter (not shown) may adjust an exposure time of the image pickup device 118. Examples of the shutter may include a mechanical shutter for controlling incidence of light by mechanically moving the iris 111 and/or an electronic shutter for controlling exposure by supplying an electrical signal to the image pickup device 118.

The analog signal processing unit 120 may perform noise reduction, gain control, waveform shaping, and/or analog-digital conversion on an analog electrical signal provided from the image pickup device 118.

The signal processed by the analog signal processing unit 120 may be input to the CPU/DSP unit 170 after passing through the memory 130 or without passing through the memory 130. The memory 130 operates as a main memory of the digital photographing apparatus 100 and stores information necessary for operation of the CPU/DSP unit 170. The program storage unit 150 may store a program such as an application system or an operating system for driving the digital photographing apparatus 100.

The digital photographing apparatus 100 includes display unit 164 which may display an operating state of the digital photographing apparatus 100 or information about an image captured by the digital photographing apparatus 100. The display unit 164 may provide visual information and/or auditory information to the user. In order to provide the visual information, the display unit 164 may use, for example, a liquid crystal display (LCD) panel, or an organic light-emitting display (OLED) panel. Display unit 164 may also be a touch screen that may recognize a touch input.

The display driving unit 162 provides a driving signal to the display unit 164.

The CPU/DSP unit 170 processes an input image signal, and controls elements of the digital photographing apparatus 100 based on the image signal and/or external input signals. The CPU/DSP unit 170 may perform image signal processing for improving image quality such as noise reduction in image data, gamma correction, color filter array interpolation, color matrix correction, color correction, and/or color enhancement. The CPU/DSP unit 170 may generate an image file by compressing image data generated during the image signal processing, and may restore image data from an image file. The image data may be compressed in a reversible (lossless) or non-reversible (lossy) manner. For example, in the case of a still image, the image data may be compressed in a joint photographing experts group (JPEG) format or a JPEG2000 format. In the case of a moving image, a plurality of frames may be compressed in a moving picture experts group (MPEG) format to form a moving image file.

The image data output from the CPU/DSP unit 170 is input to the storage/readout control unit 140 after passing through or without passing through the memory 130, and the storage/readout control unit 140 stores the image data in the data storage unit 142 automatically or according to a signal input from the user. The storage/readout control unit 140 may also read image data from an image file stored in the data storage unit 142 and may provide the image data to the display driving unit 162 through the memory 130 or another path, and the image corresponding to the image data may be displayed on the display unit 164. The data storage unit 142 may be removably or permanently attached to the digital photographing apparatus 100.

The CPU/DSP unit 170 may also perform coloring, blurring, edge emphasis, image interpretation, image recognition, and/or image effects and the like. The image recognition may include face recognition and/or scene recognition. The CPU/DSP unit 170 may also perform display image signal processing and display the operating state of the digital photographing apparatus 100 or information about an image captured by the digital photographing apparatus 100 on the display unit 164. For example, the CPU/DSP unit 170 may perform brightness level adjustment, color correction, contrast adjustment, contour emphasis adjustment, screen splitting, character image generation, and/or image synthesis. The CPU/DSP unit 170 may be connected to an external monitor and perform predetermined or user controllable image signal processing to display an image on the external monitor. The CPU/DSP unit 170 may transmit the processed image data to the external monitor to display the image on the external monitor.

The CPU/DSP unit 170 may execute a program or routine stored in the program storage unit 150, and may include an additional module to generate a control signal for use in auto-focusing, zooming, focusing, and/or automatic exposure correction, and provide the control signal to the iris driving unit 112, the lens driving unit 115, and/or the image pickup device control unit 119, and may control operations of elements of the digital photographing apparatus 100 such as the shutter and a flash (not shown).

The manipulation unit 180 provides one or more control signals based on input from the user. For example, the manipulation unit 180 may include one or more of a shutter-release button for inputting a shutter-release signal to perform a photographing operation by exposing the image pickup device 118 to light for a predetermined period of time, a power button for inputting a control signal to power on/off of the digital photographing apparatus 100, a wide angle-zoom button and a telephoto-zoom button for widening or narrowing a viewing angle according to an input, and various functional buttons, such as for selecting at least one mode/function from a group comprising a text input mode, a photographing mode, a reproduction mode, a white balance setting function, an exposure setting function, and the like. The manipulation unit 180 may include any number of any type of unit whereby a user may input a control signal, such as one or more buttons, keyboards, touchpads, touch screens, remote controllers, dials, switches, or the like.

Figure 2:
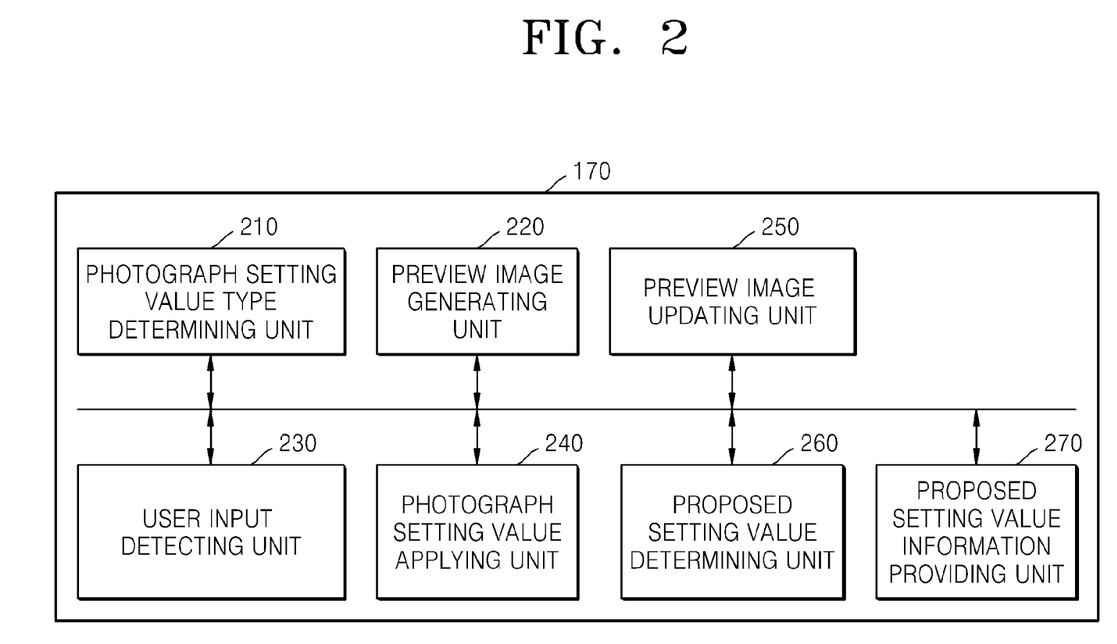
FIG. 2 is a block diagram of a central processing unit/digital signal processing (CPU/DSP) unit of the digital photographing apparatus of FIG. 1.

FIG. 2 is a block diagram of an exemplary CPU/DSP unit 170 of the digital photographing apparatus 100 of FIG. 1, according to an embodiment. In the embodiment, a user interface is provided whereby the user may set photograph setting values using preview images. The preview images may be updated using photograph setting values selected by the user. Also, information about one or more proposed photograph setting values may be provided to the user. Referring to FIG. 2, the exemplary CPU/DSP unit 170 includes a photograph setting value type determining unit 210, a preview image generating unit 220, a user input detecting unit 230, a photograph setting value applying unit 240, a preview image updating unit 250, a proposed setting value determining unit 260, and a proposed setting value information providing unit 270.

The photograph setting value type determining unit 210 determines the types of one or more photograph setting values to be used to provide preview images. The preview images may be provided, for example, as thumbnail images on the display unit 164. If the number of thumbnail images to be displayed is deemed excessive, for example, because of image processing demands and/or the number or size of the preview images displayed, the photograph setting value type determining unit 210 may limit the types of photograph setting values used to provide preview images. The photograph setting value type determining unit 210 may determine the types of the photograph setting values to use for the preview images according to predetermined selection criteria, or according to the user's selection. The configuration and operation of the photograph setting value type determining unit 210 will be explained in greater detail hereinafter.

Before generating preview images, a sample image is acquired. For example, the user interface may be used in a photographing mode, and the sample image may be obtained by capturing a live-view image. In a photographing mode, the photographing unit 110 captures the sample image and provides the sample image to the preview image generating unit 220 of CPU/DSP 170. Alternatively, the sample image may be obtained from image data stored in data storage unit 142.

The preview image generating unit 220 generates one or more preview images by applying preview image setting values to the sample image. A plurality of preview images may be generated having preview image settings or groups of settings that are set to different values, and information about different preview images with different setting values may be provided to the user. The preview image generating unit 220 may thus process the sample image acquired by the photographing unit 110 based on preview image setting values that are respectively set to different levels. The preview image generating unit 220 provides the generated preview images to the display driving unit 162 to display the preview images on the display unit 164.

Figure 3:
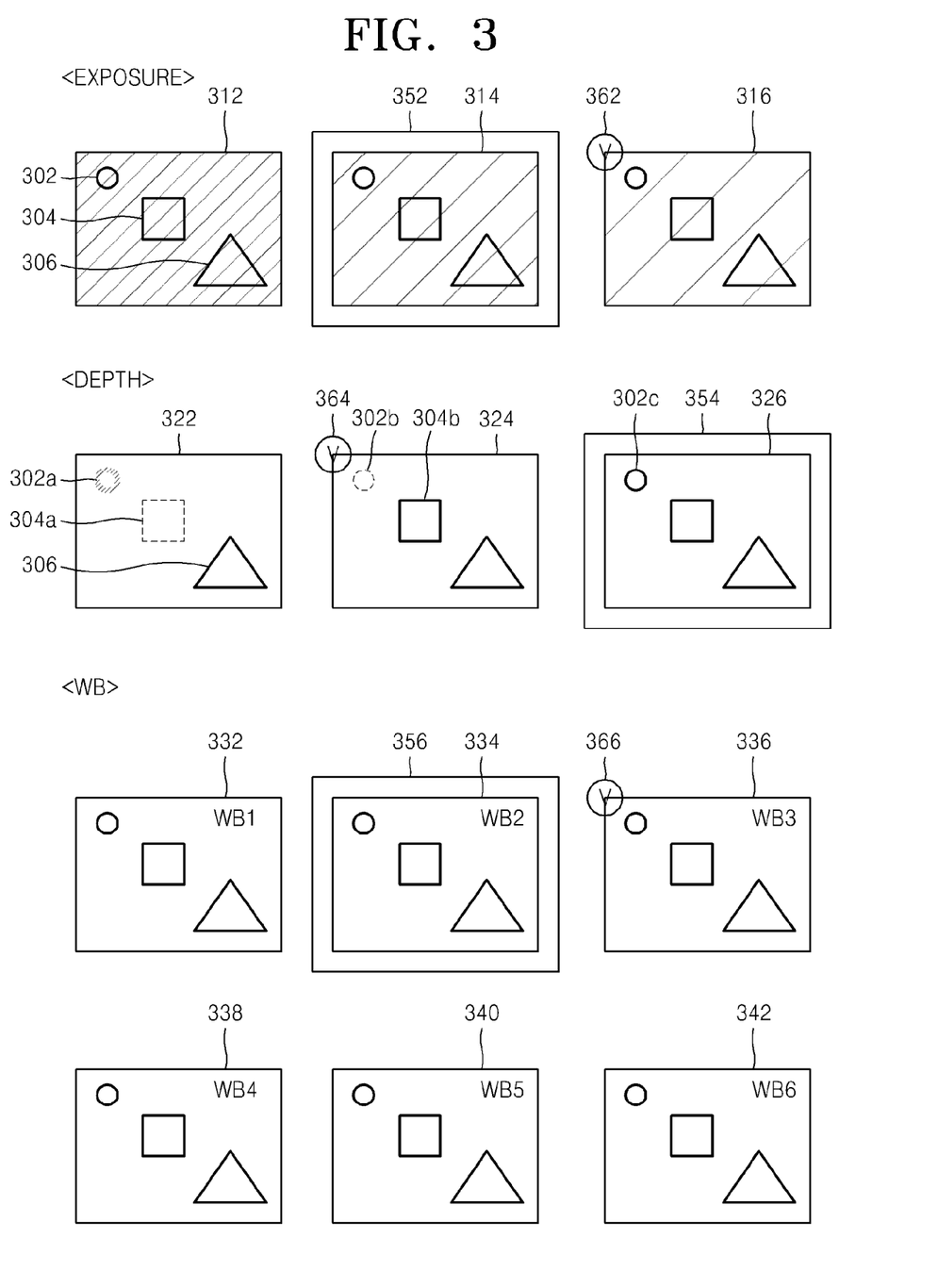
FIG. 3 illustrates providing preview images of a scene, according to an embodiment.

FIG. 3 illustrates the display of preview images of a scene, according to an embodiment. In FIG. 3, exemplary types of preview photograph setting values shown include exposure, depth, and white balance. Three exemplary preview images 312, 314, and 316 are provided based on a sample image (not shown) which have different exposure values; three preview images 322, 324, and 326 are provided which have different depth values; and six preview images 332, 334, 336, 338, 340, and 342 are provided which have different white balance values. The exemplary preview images illustrated in FIG. 3 are generated from a sample image obtained by photographing a scene that includes a first subject 302, a second subject 304, and a third subject 306. The first subject 302 is farthest from the digital photographing apparatus 100 and the third subject 306 is closest to the digital photographing apparatus 100.

The preview image 312 is generated using a relatively low exposure value compared to preview images 314 and 316, and is the darkest among the preview images 312, 314, and 316. The exposure value of the preview image 314 is greater than that of the preview image 312 and less than that of the preview image 316. The preview images 312, 314, and 316 may be generated based on preview image setting values in addition to an exposure value, for example, a depth value and a white balance value.

The preview image 322 is generated using a relatively high depth value and a relatively small focus range compared to preview images 324 and 326. Thus, a first subject 302a is most out of focus, a second subject 304a is focused somewhat, and the third subject 306 is focused sharply.

Preview image 324 has a depth value less than that of preview image 322. Thus, a first subject 302b is focused somewhat, and second subject 304b is now focused sharply, as is the third subject.

Preview image 326 has a lowest depth value, and thus the first subject 302c is now focused sharply, as are the second and third subjects. The preview images 322, 324, and 326 may be generated based on preview photograph setting values in addition to a depth value, for example, an exposure value and a white balance value.

The preview images 332, 334, 336, 338, 340, and 342 are generated using different white balance values, i.e., differently adjusted color intensities. The preview images 332, 334, 336, 338, 340, and 342 may be generated using preview photograph setting values in addition to a white balance value, for example, an exposure value and a depth value.

The user may set a photograph setting value by selecting one of the preview images displayed in FIG. 3. For example, if the user selects preview image 316, a photograph exposure value is set to the exposure value used to generate preview image 316.

In an embodiment, marks such as 352, 354, and 356 may be used to indicate current setting values of the exposure, depth, and white balance types, respectively, and may be displayed together with the preview images.

The user may select one of the preview images, for example, using manipulation unit 180. The user input detecting unit 230 detects the user selection. The photograph setting value applying unit 240 applies photograph setting types and values to the setting types and values used to generate the preview image selected by the user.

Once a user input selecting one of preview images for a first photograph setting type is detected, the preview image updating unit 250 applies the setting value for that setting type to generate new preview images for the other preview image setting types and values. For example, in the exemplary preview images of FIG. 3, the exposure value is initially set to the exposure value corresponding to preview image 314, as indicated by box 352. The preview images 332, 334, 336, 338, 340, and 342 and the preview images 322, 324, and 326 are all generated using that initial exposure value. If the user selects preview image 316, which was generated using a different exposure value, the preview images 322, 324, and 326 and the preview images 332, 334, 336, 338, 340, and 342 are all updated using the exposure value that corresponds to image 316. Thus, the user can immediately know what an image will look like using selected setting values.

The proposed setting value determining unit 260 may determine a proposed setting value for one or more preview image setting types in a current photographing environment. For example, if photographing is performed in a dark environment, in order to increase the visibility of the visual field in a photograph a high exposure value such as that used in preview 316 may be proposed as an exposure value. In an exemplary embodiment, the process of determining proposed setting values may be performed by the CPU/DSP unit 170, and the proposed values may be used as actual setting values in an automatic photographing mode.

The proposed setting value information providing unit 270 may provide information about proposed setting values along with the preview images. For example, an indicator 362 indicating a proposed exposure setting value may be displayed on a preview image that was generated using the proposed value. Similarly, indicators 364 and 366 indicate proposed setting values for depth and white balance value types, respectively, and may be displayed on the preview images having the proposed setting values, as shown in FIG. 3.

Figure 4:
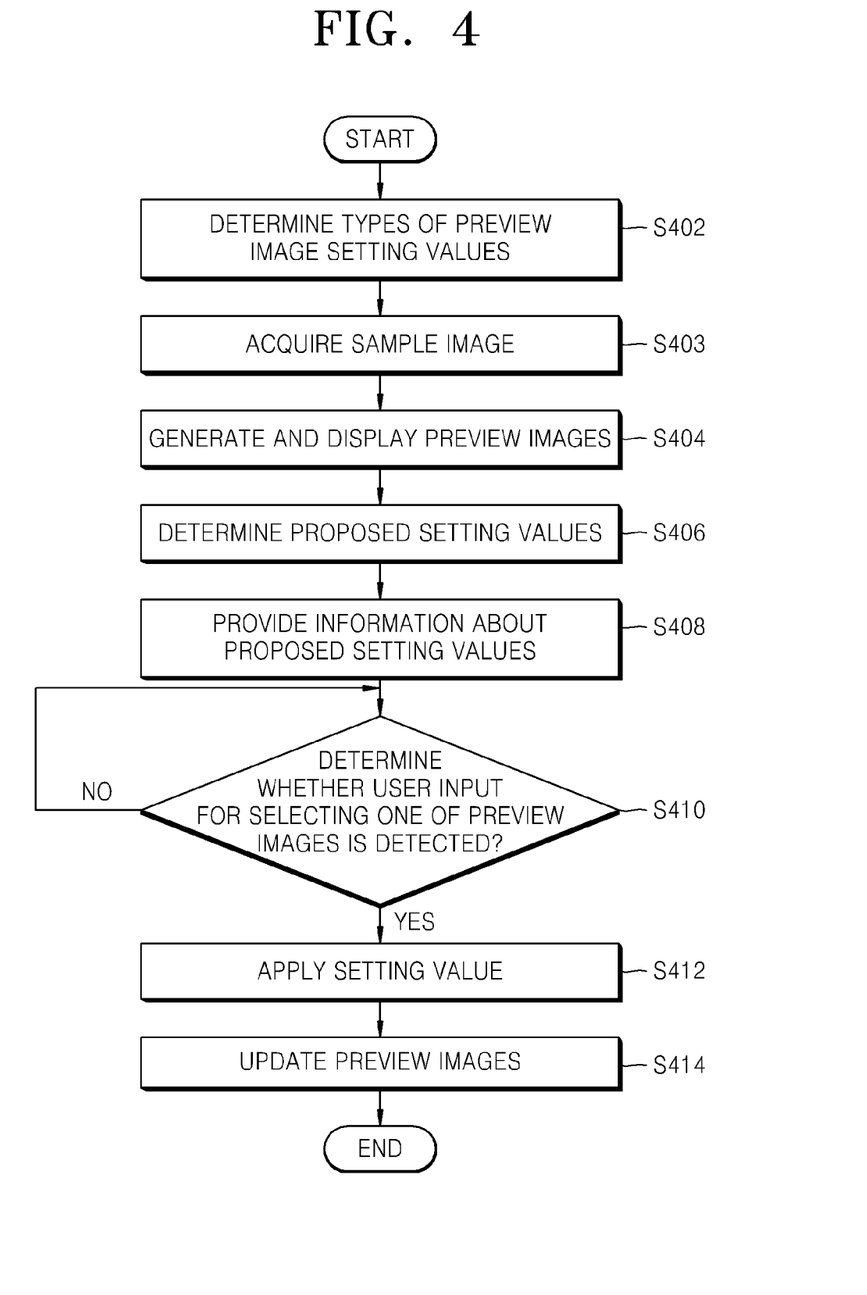
FIG. 4 is a flowchart illustrating a method of controlling the digital photographing apparatus of FIG. 1.

FIG. 4 is a flowchart illustrating a method of controlling the digital photographing apparatus 100 of FIG. 1, according to an exemplary embodiment. In step S402, the types of one or more preview image setting values are determined. In step S403, a sample image is acquired. Steps S402 and S403 may be performed in any order or simultaneously.

In step S404, preview images are generated using the sample image and the determined setting types, each preview image associated with one of the setting types. The preview images are displayed, such as on the display unit 164. The preview images may be generated and displayed as described hereinbefore in connection with FIG. 3, for example.

In step S406, setting values for one or more of the determined setting types are proposed. In step S408, information about the proposed setting values is provided along with the preview images. Step S406 need not be performed in the order shown in FIG. 4, but is performed before step S408.

In step S410, it is determined if a user input is detected selecting one of the preview images. If so, the method proceeds to step S412. In step S412, the setting type and value corresponding to the selected preview image are applied as a photograph setting value. In step S414, preview images associated with other setting types are updated using the selected setting type and value.

Figure 5:
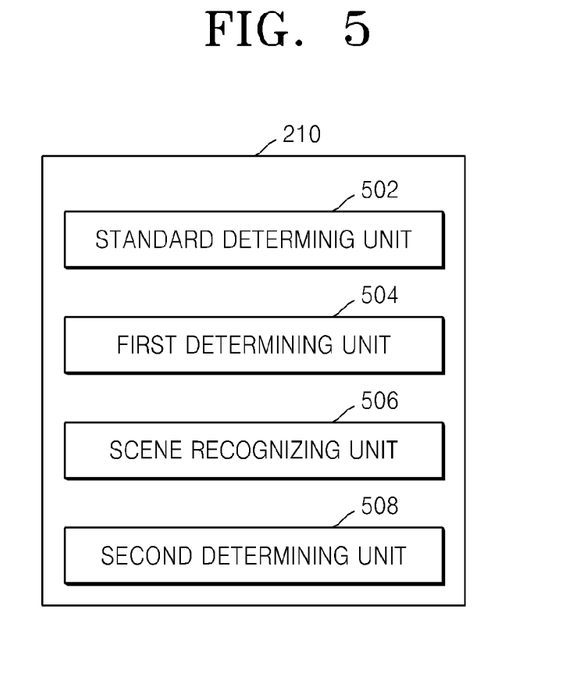
FIG. 5 is a block diagram of a photograph setting value type determining unit of the CPU/DSP unit of FIG. 2.

FIG. 5 is a block diagram of an exemplary photograph setting value type determining unit 210 of the CPU/DSP unit 170 of FIG. 2, according to an embodiment of the present invention. The photograph setting value type determining unit 210 may determine the setting types of one or more preview image setting values to use to generate preview image, based on user input or on predetermined values.

If there is a user selection designating the types of preview image setting values to use, the types may be determined according to the user selection. Alternatively, the types may be determined based on automatic scene recognition.

Referring to FIG. 5, the exemplary photograph setting value type determining unit 210 includes a standard determining unit 502, a first determining unit 504, a scene recognizing unit 506, and a second determining unit 508.

The user may select the types and/or values of the initial preview image settings by using the manipulation unit 180. The standard determining unit 502 determines whether the user has selected initial preview image setting types and/or values. If so, the standard determining unit 502 causes the first determining unit 504 to determine the types of the designated preview image setting values.

If there are no user selected types or values, the standard determining unit 502 causes the scene recognizing unit 506 to automatically recognize a photographing scene, and causes the second determining unit 508 to determine the types of preview image setting values to use to generate preview images based on the scene recognition.

The scene recognizing unit 506 may variably recognize the photographic scene according to light quantity, subject characteristics, composition, and/or color of a captured image, and the like. A photographing scene may be recognized, for example, as a night scene, a beach/snow scene, a portrait, a landscape, a sport scene, or a back light scene.

Illustratively, the types of preview image setting values may be determined in accordance with automatic scene recognition as shown, for example, in Table 1.

TABLE 1

| Type of scene | Types of preview photograph setting values |
|---|---|
| Night scene | Hand-shake correction degree, light irradiation degree, flash emission amount, flash emission type |
| Beach/snow scene | Exposure degree, back light correction degree, saturation degree |
| Portrait | Portrait correction degree, red-eye correction degree, brightness value, depth value |
| Landscape | Saturation degree, color, depth value |
| Sport scene | Exposure degree, panning setting value, continuous shooting setting value, continuous auto-focusing setting value |
| Back light scene | Exposure degree, smart range, high dynamic range (HDR), spot, center-weighted, and multi-segmented metering, flash, bracket setting value |

Illustratively, the types of the preview photograph setting values may be based on or selected from photograph setting values listed in Table 1. For example, in a back light scene, preview images may be provided according to an exposure degree, according to whether an HDR function or a smart range function for adjusting the number of gray levels is activated, according to a pot, center-weighted, and multi-segmented metering method, according to whether a flash is turned on or off, or according to brackets with brightness. Since the digital photographing apparatus 100 automatically designates types of preview image setting values that are important in each scene, and preview images are automatically provided, the user can be conveniently guided to capture a higher quality image.

Figure 6:
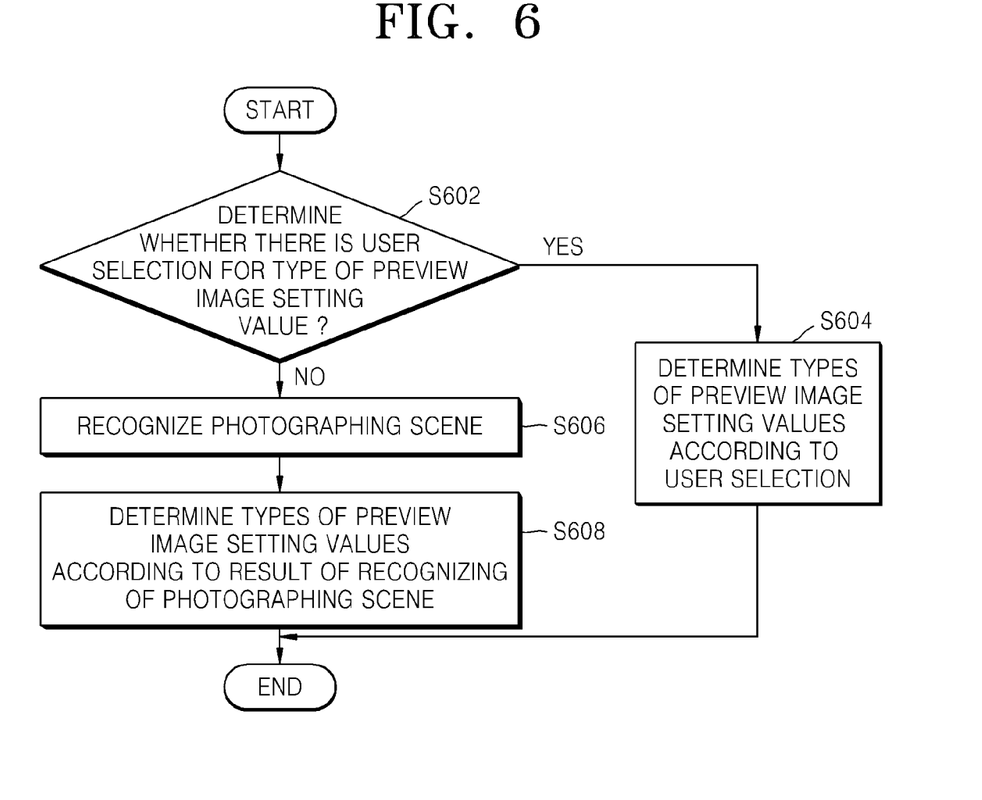
FIG. 6 is a flowchart illustrating a method of determining types of preview image setting values, according to an embodiment.

FIG. 6 is a flowchart illustrating a method of determining types of preview image setting values, according to an embodiment. In step S602, it is determined whether there is user selection designating types and/or values of preview image settings. If so, the method proceeds to step S604. In step S604, the preview image setting value types are determined according to the user selection.

However, if it is determined in step S602 that there is no user selection, the method proceeds to step S606, where a photographing scene is automatically recognized. In step S608, the preview image setting types are determined according the recognizing of the photographing scene. The preview image setting types may be determined, for example, according to Table 1.

Figure 7:
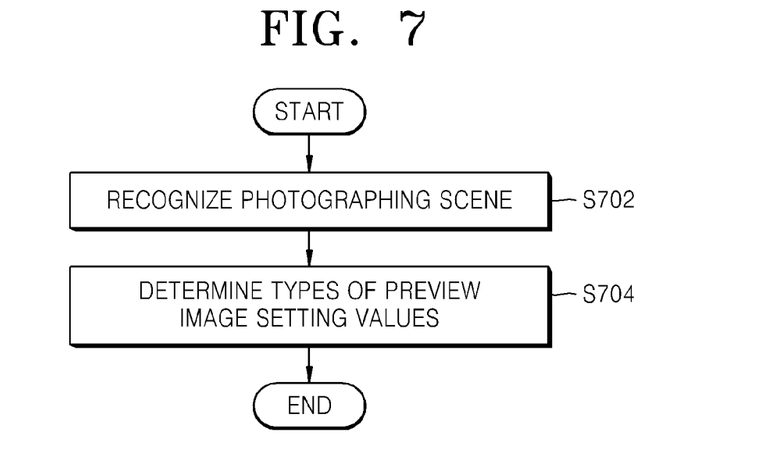
FIG. 7 is a flowchart illustrating a method of determining types of preview image setting values, according to another embodiment of the present invention.

FIG. 7 is a flowchart illustrating an alternative method of determining types of preview image setting values, in accordance with another exemplary embodiment. In this embodiment, the digital photographing apparatus 100 automatically determines the types of the preview image setting values according to the result of the recognizing of the photographing scene, without checking for user selected types of preview image setting values.

Referring to FIG. 7, in step S702, a photographing scene is automatically recognized, for example, in a live-view mode. In step S704, types of preview image setting values are determined according to the recognizing of the photographing scene.

Alternatively, the types of the preview photograph setting values may be determined according to user selection.

In accordance with the herein disclosed apparatus and methods, a user may apply photographing setting types and values easily and intuitively using preview images.

The user may also apply photographing setting values easily and appropriately because types of preview image setting values may be determined through automatic scene recognition, and proposed setting values may be displayed together with preview images.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as the semiconductor memory 210 illustrated in FIG. 2, random-access memory (RAM), read-only memory (ROM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains can easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein can be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including,"

"has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of controlling a digital photographing apparatus, the method comprising:
    acquiring a sample image;
    automatically recognizing, by a processor, a scene in the acquired sample image, wherein the recognized scene comprises one of the following scene types: a night scene, a beach scene, a snow scene, a portrait scene, a landscape scene, a sport scene, and a back light scene;
    determining a plurality of groups of preview image setting values based on the recognized scene;
    generating a plurality of preview images based on the sample image, wherein each preview image is generated from the sample image so as to have a group of different preview image setting values according to a corresponding one of the plurality of groups of preview image setting values; and
    displaying the plurality of preview images.

2. The method of claim 1, further comprising:
    detecting a user input selecting one of the plurality of preview images; and
    applying to a digital photographing apparatus a setting type and value corresponding to the selected preview image.

3. The method of claim 1, wherein the types of the one or more preview image setting values are determined according to a user selection.

4. The method of claim 1, wherein the determining of the plurality of groups of preview image setting values comprises:
    determining whether there is a user selection designating the plurality of groups of preview image setting values;
    if there is a user selection, determining the plurality of groups of preview image setting values at least in part according to the user selection, and if there is not a user selection, determining the plurality of groups of preview image setting values according to the recognizing.

5. The method of claim 1, wherein, if the photographing scene is recognized as a night scene, the types of the one or more preview image setting values include at least one of a hand-shake correction degree, a light irradiation degree, a flash emission amount, and a flash emission type.

6. The method of claim 1, wherein, if the photographing scene is recognized as a beach or snow scene, the types of the one or more preview image setting values include at least one of an exposure degree, a back light correction degree, and a saturation degree.

7. The method of claim 1, wherein, if the photographing scene is recognized as a portrait, the types of the one or more preview image setting values include at least one of a portrait correction degree, a red-eye correction degree, a brightness value, and a depth value.

8. The method of claim 1, wherein, if the photographing scene is recognized as a landscape, the types of the one or more preview image setting values include at least one of a saturation degree, a color, and a depth value.

9. The method of claim 1, wherein, if the photographing scene is recognized as a sport scene, the types of the one or more preview image setting values include at least one of an exposure degree, a shutter speed, a shutter back light, a panning setting value, a continuous shooting setting value, and a continuous auto-focusing setting value.

10. The method of claim 1, wherein, if the photographing scene is recognized as a back light scene, the types of the one or more preview image setting values include at least one of an exposure degree, a smart range, a high dynamic range, a spot, a center-weighted, and a multi-segmented metering, a flash, and a bracket setting value.

11. The method of claim 1, further comprising:
    detecting whether there is a user input selecting at least one of the plurality of preview images; and
    if a user input is detected, applying to a digital photographing apparatus a setting type and value corresponding to the at least one selected preview image.

12. The method of claim 1, further comprising:
    determining a proposed setting value for at least one of the one or more preview image setting types; and
    providing information about the proposed setting value.

13. A digital photographing apparatus comprising:
    a photographing unit configured to acquire a photographic image and a sample image;
    a scene recognizing unit configured to automatically recognize a scene in the acquired sample image, wherein the recognized scene comprises one of the following scene types: a night scene, a beach scene, a snow scene, a portrait scene, a landscape scene, a sport scene, and a back light scene;
    a photograph setting value type determining unit configured to determine a plurality of groups of preview image setting values based on the recognized scene;
    a preview image generating unit configured to generate a plurality of preview images based on the sample image, wherein each preview image is generated from the sample image so as to have a group of different setting values according to a corresponding one of the plurality of groups of preview image setting values; and
    a display unit configured to display at least a portion of the plurality of preview images.

14. The digital photographing apparatus of claim 13, further comprising:
    a user input detecting unit configured to detect a user input selecting one of the plurality of preview images; and
    a photograph setting value applying unit configured to apply a first photograph setting value corresponding to the preview image selected by the user.

15. The digital photographing apparatus of claim 14, wherein the photograph setting value type determining unit comprises a first determining unit configured to determine the types of the one or more preview image setting values according to the user selection.

16. The digital photographing apparatus of claim 13, wherein the photograph setting value type determining unit further comprises:
    a standard determining unit configured to determine whether there is user selection designating the plurality of groups of preview image setting values; and
    a first determining unit configured to determine, if there is a user selection, the plurality of groups of preview image setting values at least in part according to the user selection, and wherein, if there is not a user selection, the second determining unit determines the plurality of groups of preview image setting values according to a result of recognizing of the photographing scene.

17. The digital photographing apparatus of claim 13, wherein, if the photographing scene is recognized as a night scene, the types of the one or more preview photograph setting values include at least one of a hand-shake correction degree, a light irradiation degree, a flash emission amount, and a flash emission type.

18. The digital photographing apparatus of claim 13, wherein, if the photographing scene is recognized as a beach or snow scene, the types of the one or more preview photograph setting values include at least one of an exposure degree, a back light correction degree, and a saturation degree.

19. The digital photographing apparatus of claim 13, wherein, if the photographing scene is recognized as a portrait, the types of the one or more preview photograph setting values include at least one of a portrait correction degree, a red-eye correction degree, a brightness value, and a depth value.

20. The digital photographing apparatus of claim 13, wherein, if the photographing scene is recognized as a landscape, the types of the one or more preview photograph setting values include at least one of a saturation degree, a color, and a depth value.

21. The digital photographing apparatus of claim 13, wherein, if the photographing scene is recognized as a sport scene, the types of the one or more preview photograph setting values include at least one of an exposure degree, a shutter speed, a shutter back light, a panning setting value, a continuous shooting setting value, and a continuous auto-focusing setting value.

22. The digital photographing apparatus of claim 13, wherein, if the photographing scene is recognized as a back light scene, the types of the one or more preview photograph setting values include an exposure degree, a smart range, a high dynamic range, a spot, a center-weighted, and a multi-segmented metering, a flash, and a bracket setting value.

23. The digital photographing apparatus of claim 13, further comprising:
a user input detecting unit configured to detect a user input selecting at least one of the plurality of preview images; and
a preview image updating unit configured to apply to the digital photographic apparatus, if a user input is detected, a setting type and value corresponding to the at least one selected preview image.

24. The digital photographing apparatus of claim 13, further comprising:
a proposed setting value determining unit configured to determine a proposed setting value for each of the one or more types of preview image setting values; and
a proposed setting value information providing unit configured to provide information about the proposed setting value.

25. A tangible computer-readable storage medium having embodied thereon computer instructions which, when read by a computer processing unit (CPU), cause the CPU to perform a method comprising:
acquiring a sample image;
automatically recognizing a scene in the acquired sample image, wherein the recognized scene comprises one of the following scene types: a night scene, a beach scene, a snow scene, a portrait scene, a landscape scene, a sport scene, and a back light scene;
determining a plurality of groups of preview image setting values based on the recognized scene;
generating a plurality of preview images based on the sample image, wherein each preview image is generated from the sample image so as to have a group of different preview image setting values according to a corresponding one of the plurality of groups of preview image setting values; and
displaying the plurality of preview images.

26. The computer-readable medium of claim 25, wherein the method further comprises:
detecting a user input selecting one of the plurality of preview images; and
applying to a digital photographing apparatus a setting type and value corresponding to the selected preview image.

27. The computer-readable medium of claim 25, wherein the types of the one or more preview image setting values are determined according to a user selection.

28. The computer-readable medium of claim 25, wherein the determining of the plurality of groups of preview image setting values comprises:
determining whether there is user selection designating the plurality of preview image setting values; and
if there is the user selection, determining the plurality of groups of preview image setting values at least in part according to the user selection, and if there is not a user selection, determining the plurality of groups of preview image setting values according the recognizing.

29. The computer-readable medium of claim 25, wherein, if the photographing scene is recognized as a night scene, the types of the one or more preview image setting values include at least one of a hand-shake correction degree, a light irradiation degree, a flash emission amount, and a flash emission type.

30. The computer-readable medium of claim 25, wherein, if the photographing scene is recognized as a beach or snow scene, the types of the one or more preview image setting values include at least one of an exposure degree, a back light correction degree, and a saturation degree.

31. The computer-readable medium of claim 25, wherein, if the photographing scene is recognized as a portrait, the types of the one or more preview image setting values include at least one of a portrait correction degree, a red-eye correction degree, a brightness value, and a depth value.

32. The computer-readable medium of claim 25, wherein, if the photographing scene is recognized as a landscape, the types of the one or more preview image setting values include at least one of a saturation degree, a color, and a depth value.

33. The computer-readable medium of claim 25, wherein, if the photographing scene is recognized as a sport scene, the types of the one or more preview image setting values include at least one of a an exposure degree, a shutter speed, a shutter back light, a panning setting value, a continuous shooting setting value, and a continuous auto-focusing setting value.

34. The computer-readable medium of claim 25, wherein, if the photographing scene is recognized as a back light scene, the types of the one or more preview image setting values include at least one of an exposure degree, a smart range, a high dynamic range, a spot, a center-weighted, and a multi-segmented metering, a flash, and a bracket setting value.

35. The computer-readable medium of claim 25, wherein the method comprises:
detecting whether there is a user input selecting at least one of the plurality of preview images; and
if a user input is detected, applying to a digital photographing apparatus a setting type and value corresponding to the selected preview image.

36. The computer-readable medium of claim 25, wherein the method further comprises:
   determining a proposed setting value for at least one of the one or more preview image setting types; and
   providing information about the proposed setting value.

* * * * *